APPARATUS TO COMPARE A STANDARD IMAGE WITH A PRINTED IMAGE

Filed April 27, 1966 2 Sheets-Sheet 1

INVENTOR.
STANFORD B. SILVERSCHOTZ
BY
ATTORNEY

INVENTOR.
STANFORD B. SILVERSCHOTZ
BY Charles L. Johnson Jr.
ATTORNEY

United States Patent Office 3,495,216
Patented Feb. 10, 1970

3,495,216
APPARATUS TO COMPARE A STANDARD IMAGE WITH A PRINTED IMAGE

Stanford B. Silverschotz, Livingston, N.J., assignor to International Telephone and Telegraph Corporation, a corporation of Delaware
Filed Apr. 27, 1966, Ser. No. 545,595
Int. Cl. G08c *9/00;* G06f *7/02*
U.S. Cl. 340—146.2 4 Claims

ABSTRACT OF THE DISCLOSURE

Apparatus to compare a standard image with a printed image in which means are provided for synchronously scanning the standard and the printed images in a line raster pattern, storage means are coupled to the scanning means for storing a plurality of consecutive scanning lines from the scanning means, and comparison means are coupled to the storing means for comparing a scanned test line with a plurality of scanned standard lines, the comparison means produce an output indicative of the compared signal.

This invention relates generally to inspection systems and particularly to systems for automatically inspecting documents—such as paper currency, postage stamps, and the like—with reference to a standard image or document.

One of the difficulties encountered in the design of an automatic inspection system is to obtain accurate registration of an image on a document undergoing inspection relative to a standard document image, so as to permit an accurate comparison to be made between the two images in a line-for-line raster scan.

Another difficulty is to obtain precise adjustment of the registration of the test image relative to the standard image once a misalignment has been detected.

Still another problem is to provide variable control over the inspection process so that the matching criteria applied to the test image may be adjusted in accordance with the amount of significant picture detail in the area undergoing inspection.

Accordingly, an object of this invention is to provide an automatic document inspection system in which the above noted difficulties are effectively avoided.

Another object is to provide an automatic document inspection system wherein misregistration between test and standard document images, within certain predetermined limits, does not affect the operation of the system.

In accordance with the above objects an inspection system is provided in which signals photoelectrically transduced from, for example, ten successive raster scan lines of a standard document image are stored and compared to signals photoelectrically transduced from a single line of an image of a document undergoing inspection, in such fashion that if the single test line matches any one of the ten consecutive standard lines a matching signal output occurs. Conversely, if the single test line does not match any of the standard lines, a matching output does not occur and this condition is automatically responded to by error sensing apparatus as an error condition requiring further checking of the printing process by means of which the test images are being made. In addition, means are also provided for indicating at which position among the ten consecutive standard line positions a match signal output has occurred, and means are further provided for advancing or retarding the web of paper material upon which the test images are being printed, relative to the mechanism performing the printing, so that the line match condition may be correspondingly advanced or retarded towards a predetermined central position. The latter operation is quite useful where environmental conditions such as heat and the like cause stretching of the web of paper material on which the test images are printed, or changes in dimension of the mechanical elements around which the test and standard documents are deployed. Where an error condition occurs, as signified by the absence of a matching signal output, means are optionally provided for responding to either a single such error condition or to a plurality of such error conditions during the scanning of a test image. In this respect reference marks may be provided with reference to either the standard or test image field, which define critical area boundaries between which more stringent error detection criteria should be applied, and therefore between which a single line scan error condition may be interpreted as a true error, while outside of these critical areas, a number of error conditions may be permitted to occur before an error indication is required to be produced.

These and other objects and features of the present invention may be more fully understood and appreciated by considering the following detailed description thereof which is to be read in association with the accompanying drawing wherein.

Figure 1:
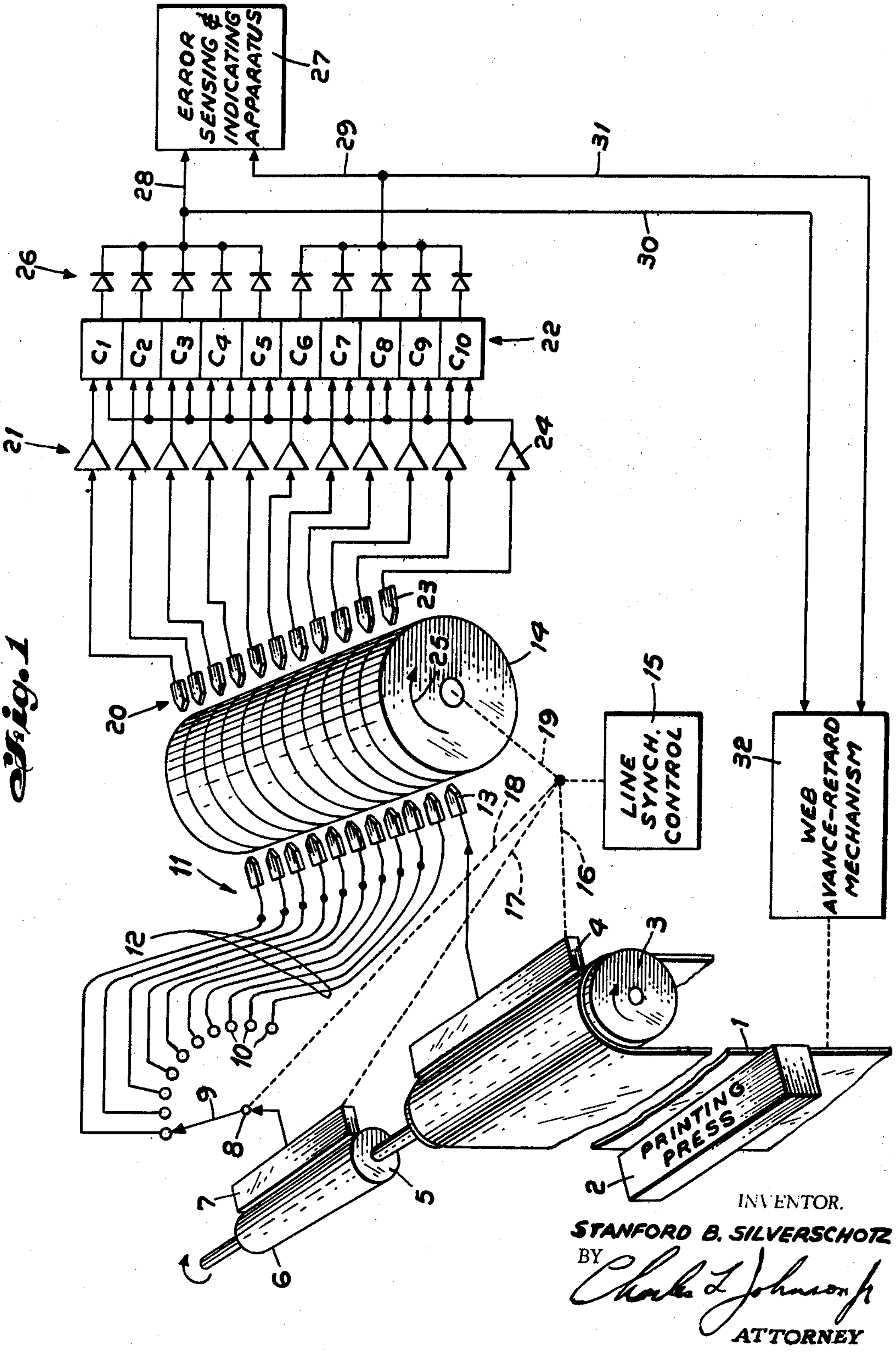
FIGURE 1 is a view, partly in elevation and partly in schematic block diagram form, of a system embodying the present invention.

Referring first to FIGURE 1, an exemplary system embodying the present invention includes a web of material 1 which is fed through a printing station 2 and over a roller 3 to a photoelectric line scanning device 4 which is adapted to scan printed images on the web 1—for example postage stamp images produced at the station 2—in a raster pattern in association with the movement of the web past the scanning station 4, and to produce corresponding electrical output signals.

At the same time, a roller 5 bearing a reference or standard image 6 is fed in synchronism with the roller 3 past a photoelectric line scanning transducer 7, to produce electrical output signals which are to be compared with the output issuing from the line scanning device 4. The output of the line scanning device 7 is fed to a distributor device schematically shown as a switch 8 including a rotating arm 9 and ten stationary taps designated 10. The movement of the arm 9, or the stepping rate of the distributor is so controlled relative to the line scanning periods of the devices 4 and 7 that successive line scan signals appear at consecutive ones of the taps 10. The outputs appearing on the stationary taps 10 are individually coupled to 10 electromagnetic transducers 11, the 10 couplings being shown as lines 12. Similarly the electrical output of the line scanning device 4 is applied to an electromagnetic transducer 13. The ten electromagnetic transducers 11 and the transducer 13 are individually positioned in proximity to 11 associated tracks of a magnetic drum 14 which is controlled in synchronism with the line scanning devices 4 and 7 so as to perform exactly one revolution during each line scan period. The transducers 11 and 13 are effective to convert electrical signals incident thereon to magnetic signals which are inscribed on the respective tracks of the drum 14 in the form of variations in the magnetic remanence condition thereon. Thus as the drum rotates through 10 successive revolutions, the signals placed on the 10 tracks facing the transducers 11 represent 10 successive line scans of the device 7 relative to the standard image 6, while in the same 10 revolution interval 10 different scanned lines of the test image on the web 1 are transferred to the 11th track of the drum via the transducer 13.

As noted above the scanning motions of the devices 4 and 7, the rotational motion of the drum 14, and the sequencing of the distributing device 8 are controlled in synchronism. This is accomplished by providing a common source of control signals 15, which, as denoted schematically by the dotted lines 16 through 19 are respectively used to initiate the respective line scans of the devices 4 and 7, as well as to initiate the successive steps of the distributing device 8, and to synchronize the driving of the drum so that exactly one revolution is described by the drum during each line scan interval. As such synchronization techniques are well known and well understood in the art no further description thereof is given below.

The 10 tracks of the drum associated with the transducers 11 circulate in parallel past 10 associated read transducers indicated by an arrow at 20. The latter transducers convert their respective incident magnetic variations into corresponding electrical signals which are amplified and clipped by 10 corresponding circuits indicated by an arrow at 21. The outputs of the latter are applied individually to corresponding comparison circuits $C_1$ to $C_{10}$ indicated by an arrow at 22.

Similarly the signals on the drum track corresponding to the transducer 13 are fed past a reading station 23 in parallel with the signals transversing the reading stations 20, and amplified and clipped by a circuit 24 the output of which is applied in common to all of the 10 comparison circuits $C_1$ to $C_{10}$. The outputs of the circuits 21 and 24 preferably binary level signals, and the comparison circuits 22 are preferably logic circuits of the inverse exclusive-OR type which are responsive to produce an output variation in a predetermined sense only when both of the inputs thereto are at matching levels (i.e. both high or both low).

Since the period of revolution of the drum 14 is exactly one line scan interval, it may easily be appreciated that if the standard and test images correspond the signals incident on the transducer 23, and therefore the output of the circuit 24 should identically match one of the signals incident on the ten transducers 20, depending upon the position of the distributing device 8, at the time at which these signals are first deposited on the respective tracks of the drum. Accordingly, a corresponding one of the comparison circuits 22, individually identified as circuit $C_1$ to $C_{10}$ should be actuated to produce an output signal indicative of a match. If this does not occur, this is indicative of an error condition which is sensed and responded to in a manner discussed below.

The outputs of the comparison circuits $C_1$ to $C_{10}$ are coupled via individually corresponding isolating and mixing diodes 26 to one of two inputs of error sensing and indicating apparatus 27, said two inputs being indicated by lines 28 and 29. Should the matching output occur in the group of comparison circuits $C_1$ to $C_5$, the input to the apparatus 27 arrives via the line 28, while if the matching output occurs in the group $C_6$ to $C_{10}$ the corresponding input to the apparatus 27 is translated via the line 29. Within the apparatus 27 the signals on the lines 28 and 29 are mixed to form a single signal which is then sensed as an indication of satisfactory operation. More particularly, a simultaneous absence of matching signals on both of the lines 28 and 29 is treated as an error condition which is responded to in a manner described below by the apparatus 27. The signals translated via the lines 28 and 29 are also respectively conveyed via the lines 30 and 31 to a web advance-retard mechanism 32 which is effective to slightly vary the line position of the web 1 relative to the printing press 2, by discrete scanning line increments, and in either a forward or a reverse sense, so as to correspondingly advance or retard the comparison circuit position at which the matching output occurs with respect to a central position, that is, towards the positions represented by the comparison circuits $C_5$ and $C_6$. Thus, a signal on either of the lines 30 and 31 is indicative of a coarsely accurate registration of the images being deposited on the web 1 relative to the standard image 6, and the mechanism 32 is effective to advance or retard this registration towards a central position within a fine range of 10 lines, so as to permit subsequent slippage or misregistration of the printed matter on the web 1, within the said fine range, without loss of coarse registration. Means for advancing or retarding a web being conveyed relative to a printing station, or any other station for that matter, are well known and require no further elaboration, means suitable for this purpose are commonly used in photofacsimile machines to align sending and receiving stations, where the paper drive motor is caused to drop or pick up poles to slow or advance a paper web in the receiver. It may also be appreciated that instead of feeding 10 successive lines of the standard image to 10 respective tracks of the drum 14, 10 consecutive lines of the test image could be fed to 10 consecutive tracks of the drum and compared against single lines of the standard image recorded on a single track.

Figure 2:
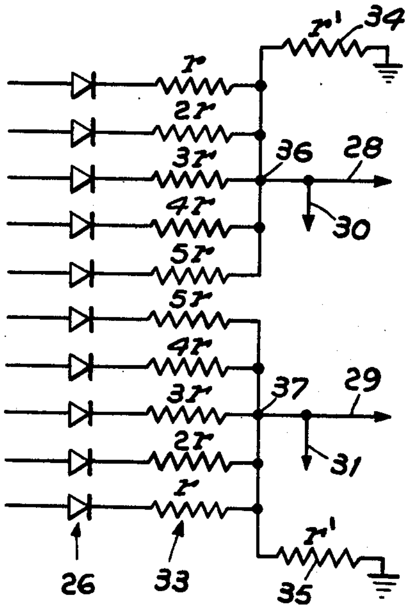
FIGURE 2 is a schematic circuit diagram illustrating a circuit useful to produce match-indicating signals of different amplitudes depending upon the line scan position in which a match occurs.

In order to exert a varying degree of control over the advancement or retardation of the motion of web 1 in FIGURE 1, and thereby to avoid excessive oscillations through the central position noted above, the outputs translated through the diodes 26 from the comparison circuits 22 may be varied or graduated in amplitude by means of a circuit such as that shown in FIGURE 2. In this circuit, the outputs of the diodes 26 are individually conveyed through ten associated resistors 33 into either the resistor 34 or the resistor 35. The reistors 34 and 35 are equal in value, the value thereof being denoted as $r'$. The resistors 33, however, are of different values which are multiples of a unit value $r$. Thus, the outermost resistors are equal in value to $r$, the next two outermost resistors are equal in value to $2r$ and so forth up to the value $5r$. By this means a signal applied to one of the diodes 26 will be differently attenuated at the voltage divider tap 36 or 37, to which the signal is translated, depending upon the relative position of the particular diode 26 to which the signal is applied. Signals applied to the outermost diodes will therefore undergo the least attenuation, while signals applied to the innermost diodes will undergo the most attenuation and signals applied to intermediate diodes will experience intermediate amounts of attenuation. Thus, the signals conveyed to conductor 30 or 31 will be of graduated amplitude depending upon the degree of line misregistration between the test and standard images.

Figure 3:
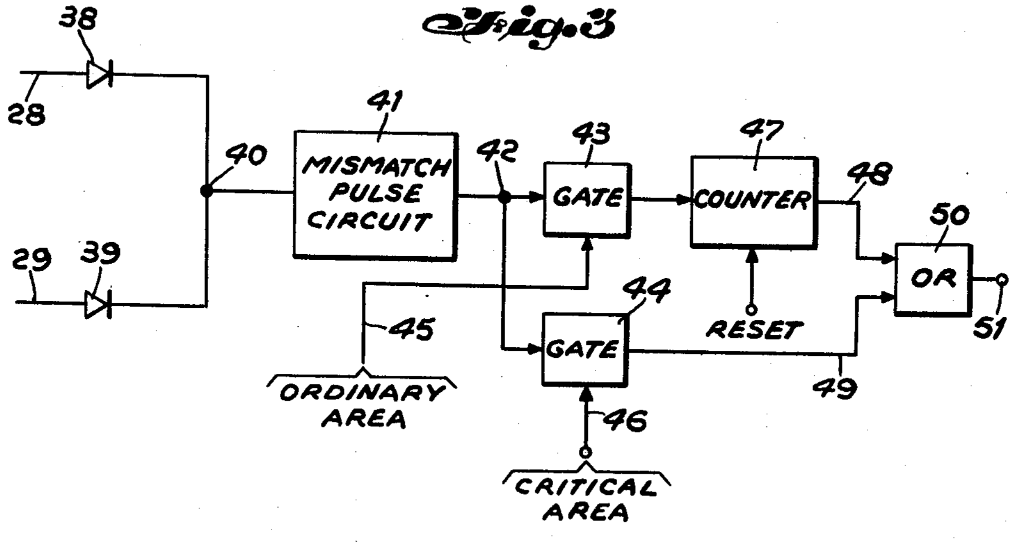
FIGURE 3 is a schematic block diagram illustrating the circuitry employed to sense and respond to an error condition occurring during the scanning process of the present invention.

As shown in FIGURE 3 the signals conveyed along lines 28 and 29 pass through isolating and mixing diodes 38 and 39 respectively, the outputs of which are combined at 40. A signal at junction 40 is conveyed to a circuit 41, which is adapted to produce a pulse output at 42 in response to signal transitions of a given polarity at 40, each such transition being indicative of a mismatch. The pulse signals at 42 are passed through one of two gates, 43 or 44, depending upon the condition of control signals applied to respective control inputs 45 and 46 of these gates. The output of gate 43 is fed to a counter 47 which is adapted to produce a pulse on its output lead 48 upon receipt of a predetermined number of input pulse counts. Gate 44 is similarly adapted to convey a pulse to its output lead 49 for each input pulse applied thereto, when the control signal on lead 46 is of appropriate enabling amplitude. The outputs on leads 48 and 49 are fed through an OR-circuit 50 to an output terminal 51. Thus, the appearance of a signal at terminal 51 is indicative of one or more line mismatches in the printing operation which requires attention. For example, if the printing apparatus 2 should run out of ink, or if the print should become too light, a mismatch will ultimately occur and an output at terminal 51 will be produced.

Figure 4:
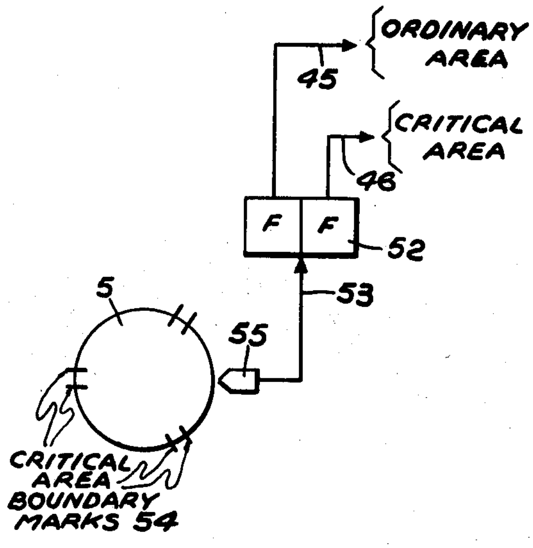
FIGURE 4 is a schematic drawing illustrating the means used to control the variation in sensing criteria associated with the circuit of FIGURE 3.

As shown in FIGURE 4 the signals on control leads 45 and 46 associated with the gates 43 and 44, respectively, in FIGURE 3 may comprise the complementary outputs of a binary toggle device 52 which is a bistable device adapted to undergo a reversal in condition for each pulse applied thereto via the input lead 53. The pulses applied to the input lead 53 are derived for example from the drum 5 by means of detection of critical area boundary marks 54 inscribed magnetically on the latter and sensed by means of an electromagnetic transducer 55. Alternatively, the web 1 may be provided with physical marks along one edge thereof which may be photoelectrically transduced by a transducer 55' (not shown) and fed to the device 52 via its input lead 53.

While I have described above the principles of my invention in connection with specific apparatus, it is to be clearly understood that this description is given only by way of example and not as a limitation to the scope of my invention as set forth in the objects thereof and in the accompanying claims.

I claim:

1. A system for inspecting finely detailed printed matter such as the image on a postage stamp comprising: a printed web of material on which is printed finely detailed images, said printed web being carried past an inspection location; a standard image corresponding to the image on said printed web, said standard image being carried past said inspection location in synchronism with said printed web; scanning means at said inspection location for synchronously scanning the image on said printed web and the said standard image in a line raster pattern; distributor means coupled to said line scanning means for synchronously distributing signals corresponding to the scanned lines of said standard image to a plurality of outputs in synchronism with the line scanning rhythm of said line scanning means; storage means coupled to said distributor means for storing the signals appearing at the said plurality of outputs of said distributor means to corresponding storage units reserved therefor, in synchronism with the line scanning rhythm of said line scanning means; additional storage means coupled to said scanning means for storing signals corresponding to the image on said printed web in a single storage unit assigned thereto; comparison means coupled by amplifying and clipping circuits to said storage means for comparing the storage signals corresponding to said image on said printed web with the storage signals representing said plurality of consecutive lines of said standard image; said indicating signal when said signals representing a line of comparison means adapted to produce an output match said image on said printed web are in a predetermined state of agreement with any one of the signals representing consecutive lines of said standard image; means coupled to said comparison means and responsive to said match indicating signal to vary the position of said printed web relative to a printing station; and means coupled to said comparison means and responsive to a discontinuation of said match indicating signal to produce a mismatching indicating signal.

2. A system according to claim 1 including within said storage means and said additional storage means, a magnetic drum rotating at one revolution per line scan, a plurality of input electromagnetic transducers for converting the electrical signals from said scanning means and said distributor means to magnetic remanence conditions thereon, and a plurality of output electromagnetic transducers for converting the respective incident magnetic variations into corresponding electrical signals.

3. A system according to claim 2, in which said comparison means includes a plurality of comparison circuits and one of said amplifying and clipping circuits couples the output transducer signal of said printed web to each of said comparison circuits, and the other amplifying and clipping circuits each connect said output transducer of said standard signal to a respective comparison circuit, so that when both the web signal and the standard signal are at matching levels, said respective comparison circuit produces an output.

4. A system according to claim 3, further including OR diodes coupling the output of said comparison circuits to said means responsive to a discontinuation of said match signal, and counter means responsive to a predetermined number of said mismatch indicating signals for producing an error signal.

References Cited

UNITED STATES PATENTS

| | | | |
|---|---|---|---|
| 3,184,714 | 5/1965 | Brown, et al. | 340—146.2 |
| 3,149,720 | 9/1964 | Woolfolk | 340—146.2 |
| 2,950,464 | 8/1960 | Hinton et al. | |
| 3,222,645 | 12/1965 | Davis | 340—146.2 |
| 3,344,258 | 9/1967 | Michels | 340—146.2 |
| 3,123,195 | 3/1964 | Hewitt et al. | 101—93 X |
| 2,909,995 | 10/1959 | Hannibal | 101—93 |
| 2,672,287 | 3/1954 | Reitfort | 235—61.7 |

MALCOLM A. MORRISON, Primary Examiner

DAVID H. MALZAHN, Assistant Examiner

U.S. Cl. X.R.

101—93; 235—61.7; 340—149